United States Patent [19]

Ribassin et al.

[11] 4,456,185
[45] Jun. 26, 1984

[54] APPARATUS FOR TREATING FOOD

[75] Inventors: Patrick Ribassin, Fontenay sous Bois; Manuel Gallardo; Alain J. L. Bertin, both of Chelles, all of France

[73] Assignee: Robot-Coupe, S.A., Bagnolet, France

[21] Appl. No.: 347,187

[22] Filed: Feb. 9, 1982

[51] Int. Cl.³ .............................................. B02C 18/12
[52] U.S. Cl. ................................... 241/92; 241/282.2; 241/285 B
[58] Field of Search .................... 241/92, 101.1, 282.2, 241/93, 282.1, 285 R, 285 A; 83/355, 356.3, 666, 676, 591, 592

[56] References Cited

U.S. PATENT DOCUMENTS 4,081,145  3/1978  Moe et al. .................. 241/285 R X
4,256,265  3/1981  Madan ............................. 241/92

Primary Examiner—Mark Rosenbaum

[57] ABSTRACT

A kitchen apparatus for treating food wherein the rotary tools of the apparatus are stored in the casing which houses the motor of the apparatus and wherein the tools comprise flat disks and are connectable to the shaft of the motor via a carrier.

5 Claims, 7 Drawing Figures

APPARATUS FOR TREATING FOOD

BACKGROUND OF THE INVENTION

The present invention relates to a kitchen treating apparatus of the type known as kitchen robot or apparatus for preparing food, enabling to achieve various kitchen duties by action of a set of interchangeable tools driven in rotation by an electrical motor, the shaft of which being provided with means allowing to receive each tool.

The various specialized functions such as rasping, chopping or cutting of fruits or vegetables, are each achieved by a rotary tool, generally in form of a disk, disposed at the upper part of a working bowl or vessel. The products are introduced through a hopper.

Due to the high speed of the driving shaft, whether this shaft is the motor shaft itself or the output shaft of a step-up or a reducing gear, it is necessary that the fixing of the tool on the shaft be rigid enough for supporting the important strains it is subject to.

Various means are known for connecting a tool on the end of a shaft. A first solution consists in forming the tool with a central opening in which is projecting the driving shaft end which is provided with a thread cooperating with a suitable nut for locking the disk on a shoulder formed on the shaft. Although it is cheap, this fixing is not satisfactory, since the strength with which the user screws the nut on the shaft is quite changeable so that the tool is practically always unproperly fixed, the nut being too or unsufficiently tightened. Further, the two threaded parts may present seizing what makes the disassembling difficult if not impossible. According to a second solution, the tool is snap engaged on the shaft end. A supplementary special tool is then necessary for the disassembling.

According to another solution, each tool is provided with a cylindrical hub surrounding the shaft on a substantial length the inner section of the hub being complementary of the shaft end outer section. For example, the shaft end may be formed with a flat spot, the hub inner section presenting a corresponding flat wall. The hub is generally made of plastic material, such as polycarbonate, and the assembly disk-hub is achieved by in-moulding. For evident practical grounds, the steel sheet forming the disk should be relatively thin, generally about ½ mm, and it needs to be stiffened. That may be achieved by forming radial ribs, e.g. three, what will allow a driving without sliding between hub and disk. The moulded hub is surrounding the radial ribs near the center. This solution also has drawbacks. One is the high cost of each tool. Another drawback is due to the ribs, forming a hollow groove in the upper tool surface, but a projeting rib on the bottom surface. When a slice is cut by a chopping blade said slice passes under the disk and is hit by the rib rotating at a high speed, before falling down in the bowl. If the cut fruit or vegetable is tender (a tomato for example), the cut slice is crushed and the appearance is not nice.

Another problem solved by present invention is the storage of the tools in suitable places for being ready to use, what is particularly difficult to achieved when each tool disk is fitted with a hub, and when there are many tools although only one is needed at a time.

SUMMARY OF THE INVENTION

The present invention has for its object to remedy to the drawbacks of the known fixing devices and to propose a good solution to the problem of storing the disk shaped tools.

According to the invention, the disk-like tools are mounted on the driving shaft by means of a carrier, said carrier being formed by a crown and a hub connected together by means of substantially radial struts. Preferably, in view of the use of a slice cutting disk, one strut has a shape similar to the form of the cutting means (blade) of said cutting disk and the interval between said strut and the following strut is greater so as to form a bigger interval, allowing the easy passage of the cut slice without damaging it. Advantageously, the disk-like tool is formed with a turned cylindrical margin, said cylindrical margin being used for placing the plane of the disk spaced apart from the struts, the distance between the disk plane and the struts (thus the height of said cylindrical margin) being greater than the height of the cutting slot.

With these provisions, a cut slice does not meet any strut before falling into the bowl.

According to another feature of the present invention, the kitchen device is characterized in that the motor casing comprises a tool storing case.

So each tool is either mounted in operating position or stored in the case provided in the motor casing. Practically, this is an important advantage. As the size of such a case is necessarily limited, tools that are fitted with a hub could not be stored in it. On the other hand, this solution can be used when the tools have a sufficiently flat form.

BRIEF DESCRIPTION OF THE DRAWINGS

Various other objects, features and attendant advantages of the present invention will be more fully appreciated as the same becomes better understood from the following detailed description of the present invention when considered in connection with the appended drawings.

DETAILED DESCRIPTION OF THE PREFERRED EMBODIMENT

Figure 1:
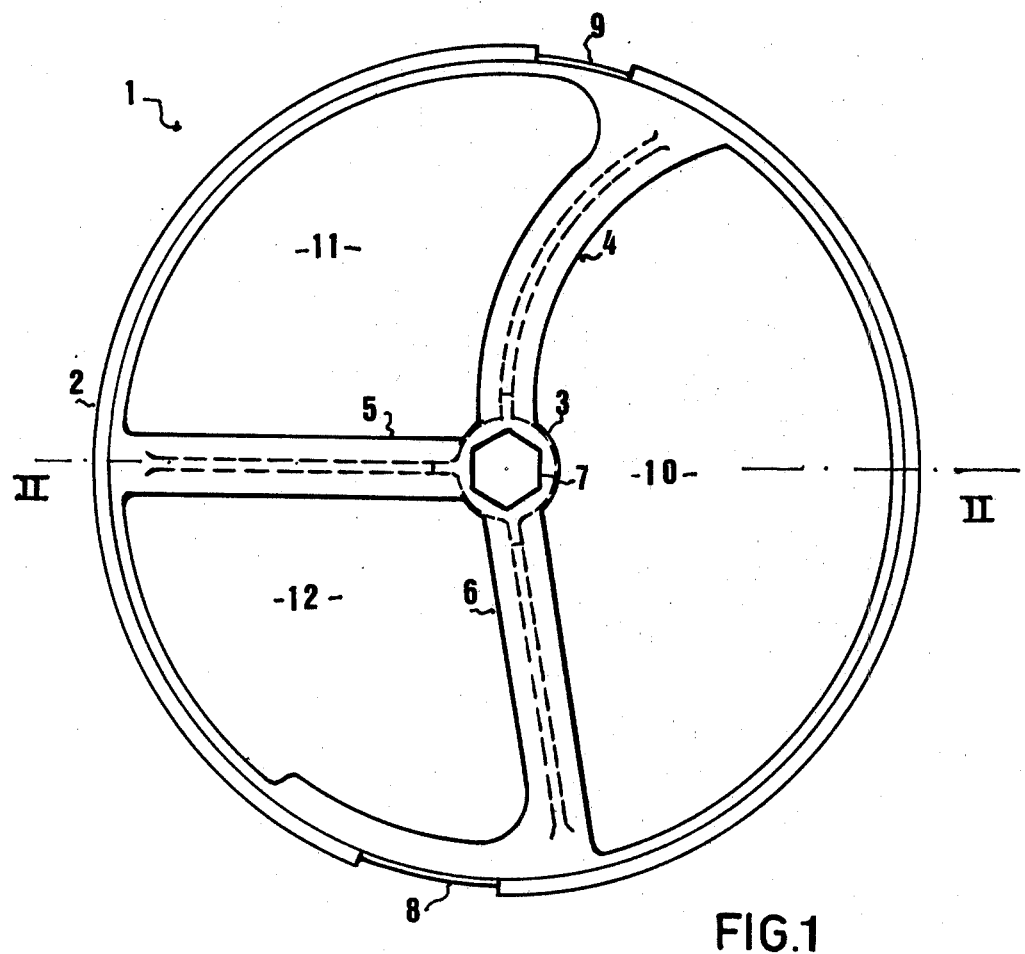
FIG. 1 is a plan view of a carrier for disk-like tools.

On FIG. 1, the carrier 1 which may be made of plastic material has the form of a circular crown 2, connected to a hub 3 by means of three radial struts 4, 5 and 6. Hub 3 is formed with a central aperture 7 which in the shown example is hexagonal. More generally the cross section of said aperture is complementary of the cross section of the motor shaft end (not shown). In the cylindrical wall of crown 2 two notches 8 and 9 of different sizes are provided for receiving corresponding lugs formed on the edges of the disks.

Said size difference provides a fool proofing means, avoiding a wrong mounting of a disk on the carrier, since for example the cutting blade of the cutting disk must be disposed above strut 4. As stated above, the struts 4, 5 and 6 are not uniformly spaced apart from each other. Strut 4 is curved, the same way as the curve of the knife or blade of a tool, and struts 5 and 6 are straight, the space 10 between struts 4 and 6 being greater than space 11 between struts 4 and 5 or space 12 between struts 5 and 6, it being clear that the disk is rotating counter clockwise when in use, so that the space under the disk is free for the slices which are cut, allowing said slices to fall into the bowl without collision.

Figure 2:
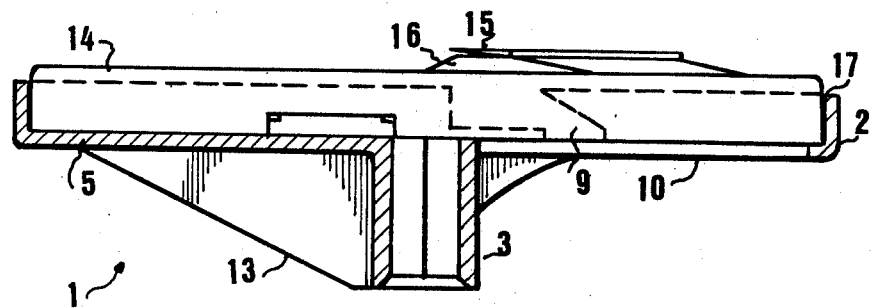
FIG. 2 is a cross sectional view of carrier of FIG. 1, along line II–II, with a chopping disk on the carrier.

On FIG. 2, are shown the hub 3, crown 2 and strut 5 whose connection with hub 3 is stiffened by a rib 13. On carrier 1 is mounted a chopping disk 14 with a blade 15 of curved shape, disposed above strut 4. Blade 15 is located above the plane of disk 14, forming a slot 16 extending substantially from the hub to the crown. Disk 14 rests on the crown 2 through its cylindrical turned margin 17, which determines the height of disk 14 above the upper surface of the struts. The disk may be fixed by lugs inserted in notches 8, 9. The form of notch 9 can be seen in dotted lines on FIG. 2. With that configuration, the tangential stresses, acting upon the disk during a cutting operation, are pushing the lugs in the bottom of the notches. The reaction due to this thrust is proportional to the stresses encountered. For example, blade 15 is welded above an aperture of disk 14. So the cut pieces of fruit or vegetable fall through space 10. The bottom axial surface of hub 3 is resting when in use on a shoulder of the driving shaft (not shown). For avoiding the cut pieces to run against one of the struts, the height of the cylindrical margin 17 is far greater than the width of slot 16. The height of margin 17, which further ensures a great stiffness to the disk, allows for adjustment of the distance between the lower edge of the hopper (not shown) and the active part of the tool such as a blade for example.

Figure 3:
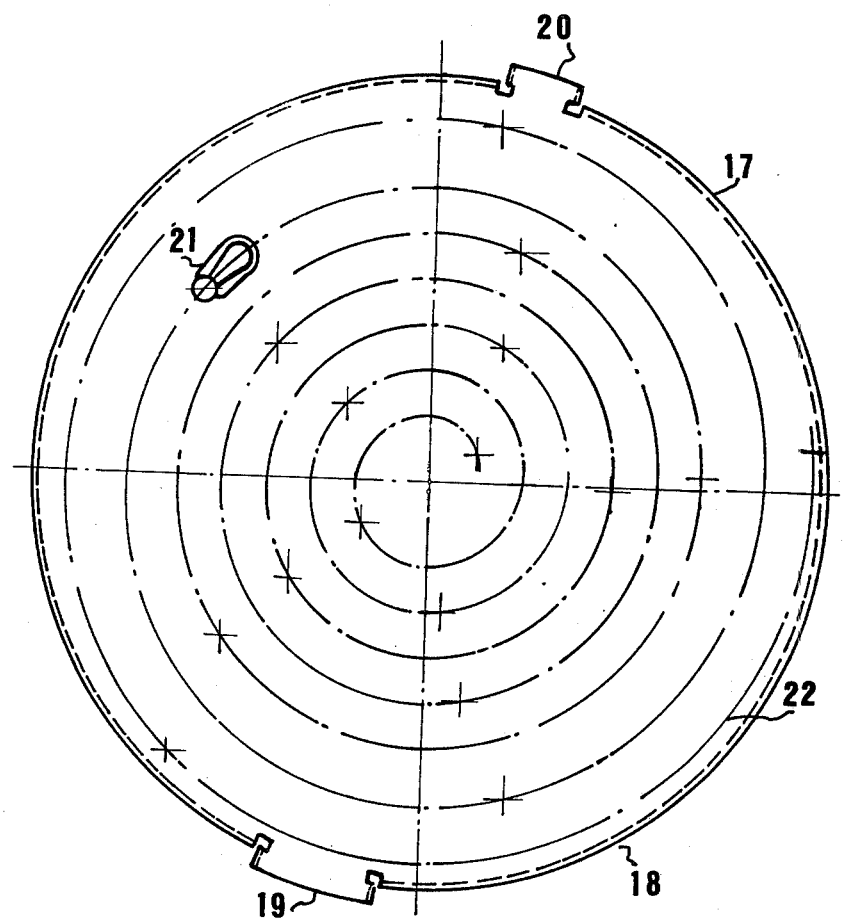
FIG. 3 is a plan view of a rasping disk.

FIG. 3 is a plan view from above of a circular grasping tool 18. The disk is shown as comprising two radially projecting lugs 19, 20 on its periphery, for insertion in notches 8, 9 of the carrier crown. The disk wall is formed with "punctures" of which only one has been represented in 21. There may be provided eighteen for example, disposed on a spiral line 22 shown in chain dotted line.

The carrier which has been described above so allows the mounting on a shaft of one of a set of tools providing various functions. All the tools have a disk-like shape of same diameter, with suitable lugs for the notches of the crown. The length (or height) of hub 3 can be sufficiently short for allowing its storage in a special case for receiving the various disks.

FIGS. 4 to 7 represent several embodiments of a storing case.

Figure 4:
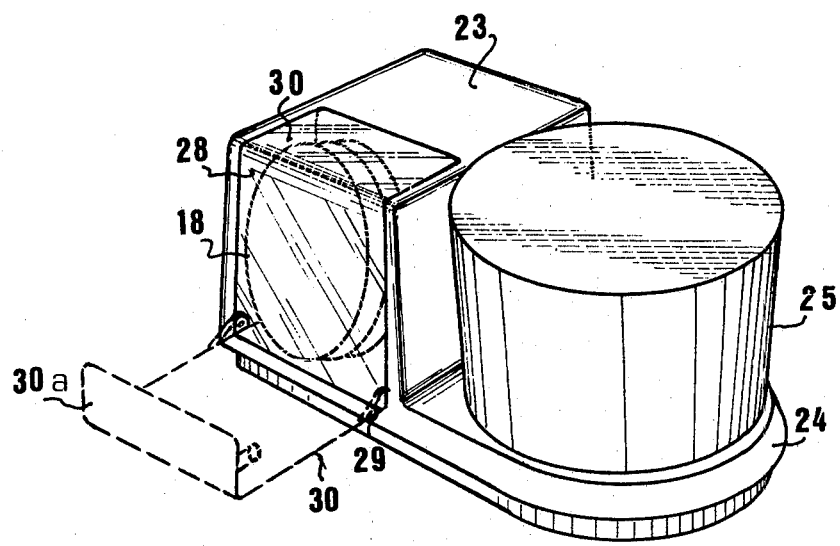
FIGS. 4 to 7 are perspective views illustrating several embodiments of the apparatus of this invention.
Figure 5:
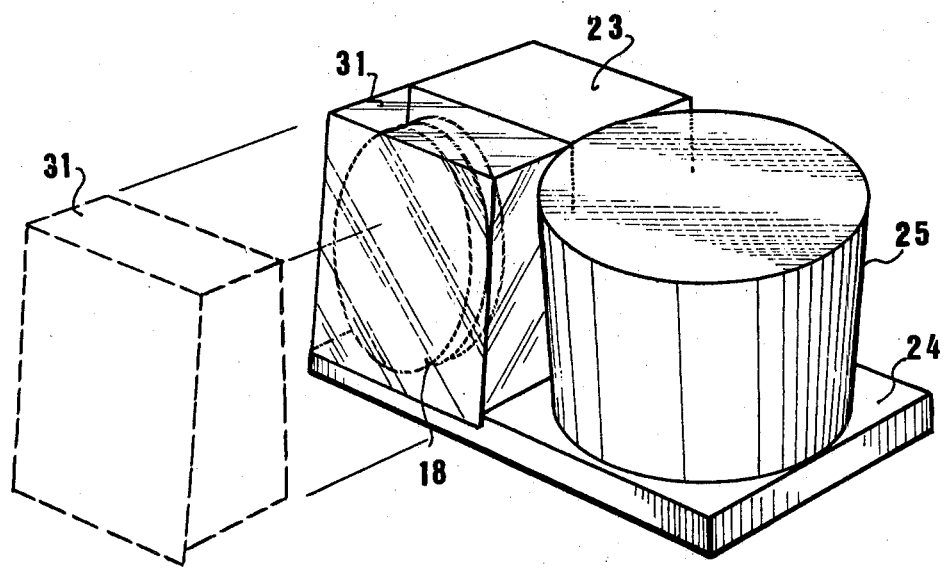
Figure 6:
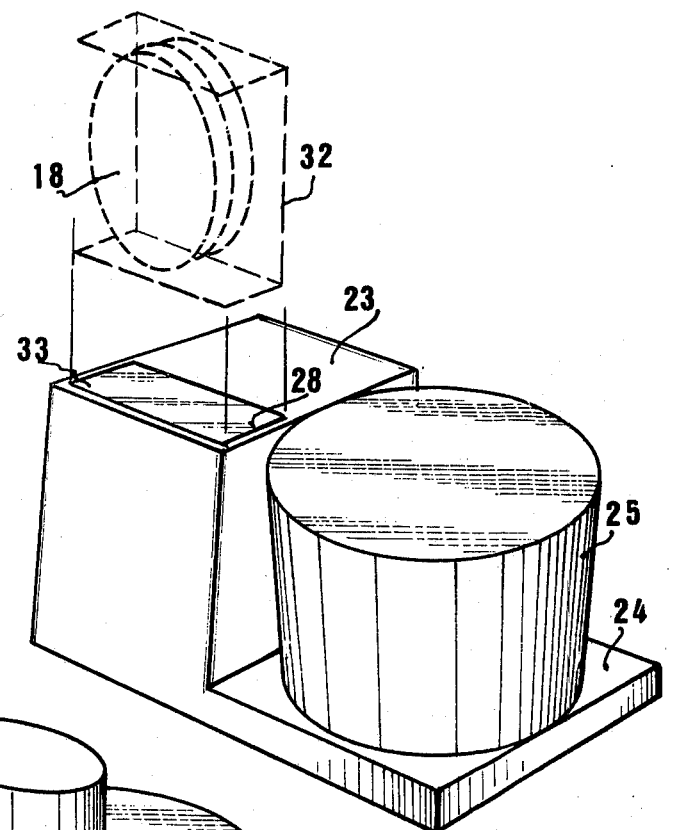

On FIGS. 4 to 6, the motor (not shown) is housed in a casing 23. The motor axle is vertical and parallel to the axis of bowl 25, which is itself removably fixed on a base 24, unitary with the motor casing. On FIG. 7, the motor is housed in a casing 26, under bowl 27, so that the motor axle is in line with the bowl axis.

On FIGS. 4 to 6, the motor is excentered with respect to the axis of base 24, and transmission of motion is ensured by a belt. This disposition presents no drawback. A space can so be saved and according to the invention, this space is used for providing a storing case for the disk-like tools, such as those above described. This case is formed with a box 28, provided with grooves in which disks 18 can be slipped and are so maintained. The case can be closed by a lid 30, which can be for example connected by a pivot with two hinges 29. The lid upper part 30a may be removably fastened in the upper wall of casing 23 by any suitable means. Preferably, the above mentioned grooves are not evenly distributed and a place is provided for inserting above described tool carrier in the case.

In the embodiment of FIG. 5, lid 31 is simply embedded in a removable manner in the motor casing 23. When one has to work with a disk lodged in case 28, lid 31 is taken apart, the desired disk is taken out and another disk can be put in its place, after what the lid 31 is placed back in its initial position. Lid 31 can be provided with lugs (not shown) for snap engagement in notches provided in casing 23.

In the embodiment of FIG. 6, the circular tools are housed in a drawer 32 which can slide inside casing 23. Preferably, drawer 32 is biased upwardly by a spring locked by a pawl, the release of which causes the drawer to slide out sufficiently for allowing to catch the drawer or to seize a tool. When drawer 32 is resting inside casing 23, case 28 is closed by means of a lid 33 which for example may be transparent.

Figure 7:
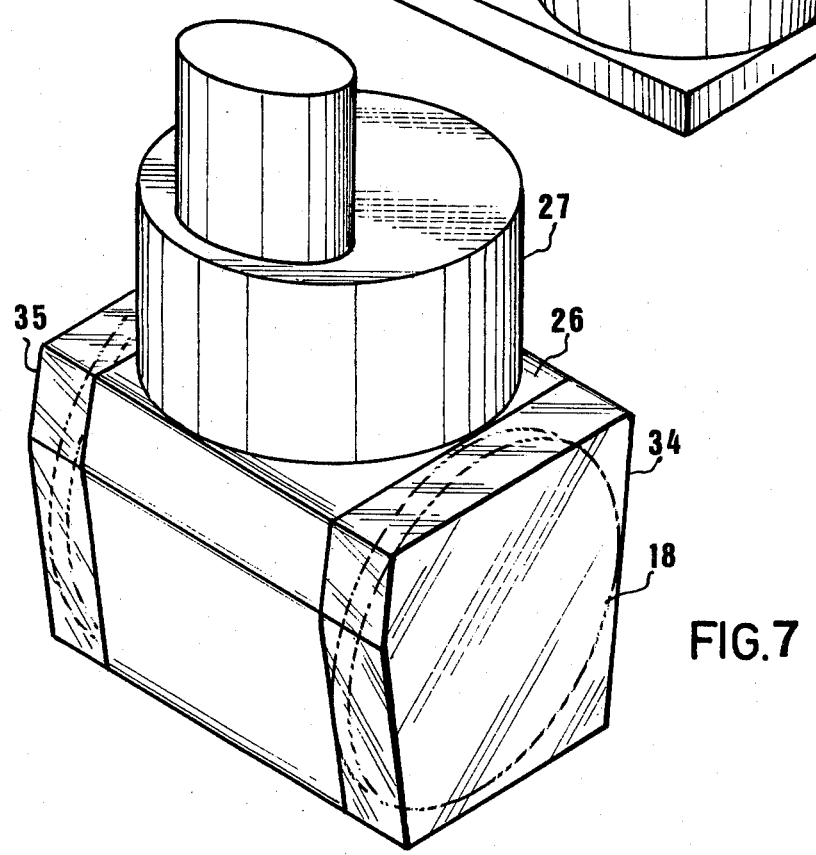

FIG. 7 represents another embodiment of the treating apparatus or kitchen robot of the invention. When the motor is centrally disposed, it is possible to provide two side cases 34 and 35 symetrically, each of which may receive several tools. It is also possible to place the motor excentrically and to transmit the motion by means of a gear. In this case, it is possible to have only one side case of a volume big enough for receiving all the tools.

It is understood that the present invention is not limited to the embodiments described and shown and that many changes are possible without departing from the scope of the invention. For example, instead of the above described lugs and notches, each tool may be fixed on the carrier by snap engagement in which the upper edge of the carrier, or a part of this edge, is projecting above the upper margin of the tool.

We claim:

1. Kitchen apparatus for treating food, comprising a motor housed in a casing and a removable bowl mounted on the casing, the dimensions of the bowl being of substantially the same magnitude as the dimensions of the casings, a driving shaft passing through the bottom of said bowl when the bowl is mounted on the casing, a set of rotary tools connectable on said shaft, wherein the tools (18) are substantially flat disks, the diameter of which being substantially the same as the diameter of the bowl, a case (28) being provided in the motor casing (23) for enabling storage of said tools inside said casing, each tool (18) being connectable to said driving shaft by means of a carrier (1), said carrier comprising: a hub (3) formed with a central aperture (7) the cross section of which being substantially the same as the cross section of the driving shaft end, whereby any tool can be connected to the shaft via the carrier or when not in use can be stored in the case (28); a crown (2) having notches (8, 9) for receiving lugs (19, 20) provided on the periphery of each tool; and radial struts (4, 5, 6) connecting the crown to the hub, said struts defining three free spaces or intervals (10, 11, 12), one (10) of these intervals being substantially twice as big as the other adjacent intervals, one (4) of the struts being curved, and the rotary direction of the carrier being such that cut products pass through the biggest interval (10).

2. Apparatus according to claim 1, wherein the tool storing case (28) is disposed in a side wall of casing (23) said case being closable by a lid (30) linked by two hinges (29).

3. Apparatus according to claim 1, wherein case (28) is formed by a cavity provide in casing (23) in which is mounted a sliding drawer (32) for housing the tools.

4. Apparatus according to claim 1, wherein each tool comprises a disk-like surface (14) the peripheral edge of which is turned into a cylindrical lateral margin (17) at least two lugs (19, 20) being cut in said margin and disposed parallel to the disk plane, said lugs being of different size.

5. Apparatus according to claim 4, wherein each tool further has a set of punctures (21) disposed on a spiral line (22).

* * * * *

UNITED STATES PATENT AND TRADEMARK OFFICE
CERTIFICATE OF CORRECTION

PATENT NO. : 4,456,185

DATED : June 26, 1984

INVENTOR(S) : Patrick Ribassin, Manuel Gallardo and Alain J. L. Bertin

It is certified that error appears in the above-identified patent and that said Letters Patent is hereby corrected as shown below:

On the cover page, after "[22] Filed: Feb. 9, 1982", insert —[30] Foreign Application Priority Data February 10, 1981 France . . . 81.02550—.

IN THE SPECIFICATION

Col. 1, line 54, "projeting" should read —projecting—.

line 62, "achieved" should read —achieve—.

line 67, after "remedy" delete "to".

Col. 3, lines 31-32, "grasping" should read —rasping—.

line 54, "excentered" should read —off center—.

Col. 4, line 20, "symetrically" should read —symmetrically—.

line 22, "excentrically" should read —off center—.

IN THE CLAIMS

Claim 3, line 2, "provide" should read —provided—.

Signed and Sealed this

Second Day of April 1985

[SEAL]

Attest:

DONALD J. QUIGG

Attesting Officer    Acting Commissioner of Patents and Trademarks